US007506355B2

United States Patent
Ludvig et al.

(10) Patent No.: US 7,506,355 B2
(45) Date of Patent: *Mar. 17, 2009

(54) TRACKING END-USER CONTENT VIEWING AND NAVIGATION

(75) Inventors: Edward A. Ludvig, Kirkland, WA (US); Jay D. Logue, San Jose, CA (US); Bruce Jenks, San Carlos, CA (US)

(73) Assignee: Microsoft Corporation, Redmond, WA (US)

( * ) Notice: Subject to any disclaimer, the term of this patent is extended or adjusted under 35 U.S.C. 154(b) by 1032 days.

This patent is subject to a terminal disclaimer.

(21) Appl. No.: 10/303,154

(22) Filed: Nov. 22, 2002

(65) Prior Publication Data

US 2004/0103426 A1    May 27, 2004

(51) Int. Cl.
*H04N 7/173* (2006.01)
*H04N 9/00* (2006.01)
*H04N 7/167* (2006.01)
*G06F 7/04* (2006.01)
*H04N 5/445* (2006.01)
*G06F 17/00* (2006.01)
*G06F 3/00* (2006.01)
*G06F 15/16* (2006.01)
*G06F 17/30* (2006.01)

(52) U.S. Cl. ............... 725/112; 725/110; 725/109; 725/51; 725/9; 715/201; 715/234; 715/700; 715/760; 726/11; 380/211; 709/201; 707/10

(58) Field of Classification Search ............... 725/112, 725/110, 109, 9, 51; 715/201, 234, 700; 715/760; 726/11; 380/211; 709/201; 707/10
See application file for complete search history.

(56) References Cited

U.S. PATENT DOCUMENTS

| 6,215,483 B1 * | 4/2001 | Zigmond ............... 725/112 |
| 6,311,197 B2 * | 10/2001 | Mighdoll et al. ....... 715/513 |
| 6,317,885 B1 * | 11/2001 | Fries ..................... 725/109 |
| 6,338,094 B1 * | 1/2002 | Scott et al. ............. 709/245 |
| 6,392,664 B1 * | 5/2002 | White et al. ........... 715/717 |
| 2002/0026642 A1 * | 2/2002 | Augenbraun et al. .... 725/109 |
| 2002/0059644 A1 * | 5/2002 | Andrade et al. ........ 725/136 |
| 2003/0041159 A1 * | 2/2003 | Tinsley et al. .......... 709/231 |
| 2003/0070170 A1 * | 4/2003 | Lennon ................. 725/51 |
| 2005/0097622 A1 * | 5/2005 | Zigmond et al. ........ 725/135 |
| 2005/0114881 A1 * | 5/2005 | Philyaw et al. ......... 725/25 |
| 2006/0053437 A1 * | 3/2006 | Bruner .................. 725/23 |
| 2006/0271958 A1 * | 11/2006 | Ukai et al. ............. 725/46 |

* cited by examiner

*Primary Examiner*—Hoang-Vu A Nguyen-Ba
(74) *Attorney, Agent, or Firm*—Lee & Hayes, PLLC (57) ABSTRACT

Systems, apparatus, and methods to track end-user content viewing and navigation in a distributed computing environment are described. In one aspect, a document for communication to a data warehouse is generated during transcoding of Web content. The document includes characteristics of Web content interface pages and links. The characteristics identify the links within scope of respective ones of the interface pages. Identifiers (IDs) in the document map the characteristics to specific ones of the interface pages and links. Transcoded source content representing the Web content is communicated to a client. Responsive to end-user presentation and navigation of the transcoded source content, the client records corresponding ones of the IDs to a log for subsequent uploading to the data warehouse. The data warehouse maps particular ones of the characteristics to corresponding log recorded ID(s) to identify specific ones of the interface pages and the links of interest to the end-user.

65 Claims, 6 Drawing Sheets

TRACKING END-USER CONTENT VIEWING AND NAVIGATION

RELATED APPLICATIONS

This patent application is related to U.S. application Ser. No. 10/262,325, titled "Systems and Methods for Dynamic Conversion of Web Content to an Interactive Walled Garden Program", filed Sep. 20, 2002, commonly assigned hereto, and hereby incorporated by reference.

TECHNICAL FIELD

The invention relates to identifying end-user interactive content viewing and navigation in a distributed computing environment.

BACKGROUND

Information is always in demand. However, access to accurate and timely information that may have been merely desirable in the past has become vital in today's global marketplace. Businesses are requiring broader access to information as a means of supporting decision-making processes and to facilitate extended relationships with customers, suppliers, and partners. This information must be gathered from various systems and sources, and stored and organized so that is easily accessible to those who need it, when they need it. Conceptually, a data warehouse is a clearing house for storing and accessing such information.

Ideally, when gathering data warehouse information, communication pathway data throughput limitations are not surpassed, and computing resources of client devices used to provide the information are not overextended. Such computing resources include, for example, processing, memory, and data storage resources. Unfortunately, existing techniques to gather end-user content viewing and navigation information for data warehouses do not typically meet such ideal goals. Instead such existing techniques often overextend communication path data throughput limitations and/or computing resources on resource constrained client devices used to provide such information to the data warehouse.

SUMMARY

Systems, apparatus, and methods to track end-user content viewing and navigation in a distributed computing environment are described. In one aspect, a content reference document for communication to a data warehouse is generated during transcoding of Web content. The content reference document includes contextual characteristics of Web content interface pages and links. The contextual characteristics identify, for example, the links within scope of respective ones of the interface pages. Substantially unique identifiers (IDs) in the content reference document map the contextual characteristics to specific ones of the interface pages and links. The Transcoded source content representing the Web content is communicated to a client. Responsive to end-user presentation and navigation of interface items provided by the transcoded source content, the client records corresponding ones of the IDs to a log for subsequent uploading to the data warehouse. The data warehouse uses the content reference document to map particular ones of the contextual characteristics to corresponding log recorded ID(s). In this manner, specific ones of the interface pages and the links of interest to the end-user are identified.

BRIEF DESCRIPTION OF THE DRAWINGS

The same numbers are used throughout the drawings to reference like features and components.

FIG. 2 is a block diagram showing further aspects of the exemplary computing environment of FIG. 1. In particular, FIG. 2 shows one implementation of the content distribution facility (CDF) portion of FIG. 1. In this implementation, the CDF is designed as a cable-head-end to broadcast digital and optionally analog content to subscribers.

FIG. 3 shows an alternate implementation of exemplary computing environment of FIG. 1. In particular.

DETAILED DESCRIPTION

An Exemplary Computing Environment

Figure 1:
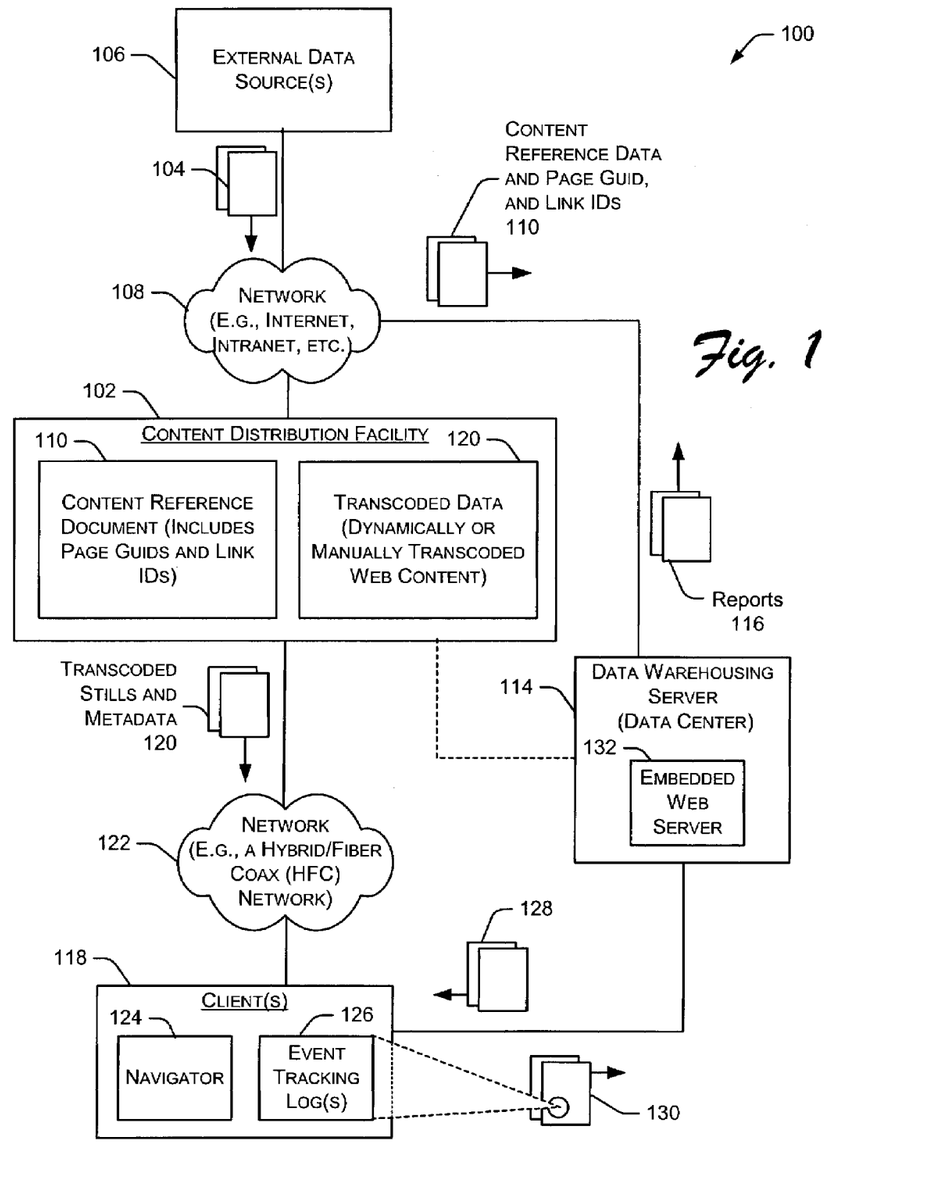
FIG. 1 shows an exemplary computing environment for tracking end-user content viewing and navigation information in a distributed computing environment.

FIG. 1 shows an exemplary computing environment 100 or IS architecture for tracking end-user interactive content viewing and use. The methods and systems described herein are operational with numerous other general purpose or special purpose computing system environments or configurations. The exemplary computing environment is only one example of a suitable computing environment and is not intended to suggest any limitation as to the scope of use or functionality of systems and methods described herein. Additionally, the exemplary computing environment should not be interpreted as having any dependency or requirement relating to any one or combination of components illustrated in the computing environment.

Examples of well known computing systems and/or component configurations that may be suitable for use in the exemplary computing environment 100 include, but are not limited to, hand-held devices, multiprocessor systems, microprocessor based or programmable consumer electronics, network PCs, minicomputers, mainframe computers, portable communication devices, and the like. Additionally, an alternate implementation of the exemplary computing environment 100 is described below in reference to FIG. 3.

As shown in FIG. 1, computing environment 100 represents a distributed IS architecture to meet the needs of operators in capturing, aggregating, storing, and reporting end-user content use. The components of the exemplary environment are scalable such that many external data sources and content distribution facilities may participate. Additionally, as described below, since a client records only compact information in response to end-user content use, end user content presentation and navigation can be tracked on substantially all clients, even those with limited processing, memory, and/or data storage resources.

To this end, one or more Content Distribution Facilities (CDFs) 102 (e.g., cable head-end facilities) download Web content 104 from external data source(s) 106 over network 108. Web content is authored using standard and well known creation tools, for example, creation tools provided in an HTML authoring tool. Web content represents walled garden Web content, any associated hypertext links exhibiting transitive closure (i.e., navigation from the walled garden is constrained). The external data source(s) distribute the Web content to facilitate functionality of IS architecture 100. To this end, external data source(s) 104 represent a Web server and any number of other types of network servers such as an EPG server, a VOD server, and so on.

Content Distribution Facility (CDF) 102 transcodes downloaded Web content 104 to extract structure, image, and hypertext link identification data, from each source page of the Web content. In one implementation, this extraction is accomplished with an Internet Explorer browser control, which dynamically transcodes the Web content into a set of MPEG still images and corresponding interaction model metadata.

The interaction model is used to mimic the interactive browsing experience that an end-user would typically experience if the end-user were browsing the non-transcoded Web content with a Web browser. The browsing experience is mimicked because the end-user does not use a Web browser to browse transcoded Web content. This is in part because the transcoded source content does not include any HTML or hypertext links, which are required for Web browser utilization. Rather, the metadata for each transcoded still identifies locations of hotspots. Hotspot locations in the stills correspond to what were originally interactive controls and/or navigable links within the Web content. The metadata further identifies navigable links to other stills, and indicates response(s) to user inputs (e.g., highlighting underlying portions of the video plane displayed on client 118) based on cursor position.

When such stills and metadata are dynamically generated, they are collectively encapsulated/referred to as an "interactive Walled Garden Program" (iWGP). Exemplary techniques for dynamically generating "interactive Walled Garden Programs" (iWGPs) from downloaded Web content 104 are described in U.S. patent application Ser. No. 10/262,325, titled "Systems and Methods for Dynamic Conversion of Web Content to an Interactive Walled Garden Program", filed on Sept. 20, 2002, commonly assigned hereto, and hereby incorporated by reference.

Responsive to receiving Web content 104 (FIG. 1) a gateway component (access control server 204 of FIG. 2) in the CDF 102 generates and assigns a page identifier (ID) for each respective page of Web content 104. The gateway component further generates and assigns a respective link ID for each navigational link on a page of Web content. The page identifiers (IDs) "globally unique identifiers" (GUIDs). This means that no one page of Web content will have a page ID equivalent to any other page of Web content. Although the link IDs could also be implemented as GUIDs, in this implementation, the link IDs corresponding to any one particular page are unique only within scope of the particular page. The generated page and link IDs are inserted into the metadata for transferring to the client.

During the CDF 102 transcoding process, contextual characteristics are extracted from the Web content 104 and inserted into a content reference document 110. Such contextual characteristics include customizable and extensible content author and/or administrative specific tracking information. For instance, a content author can insert additional information into the Web content to identify pages, images within each page, and links within each page for the purpose of supporting data warehousing. The transcoding process maps the extracted contextual characteristics to specific ones of the page and link IDs that were generated and assigned to the Web content.

TABLE 1 illustrates an exemplary content referencing document 110 presented in an XML data format.

TABLE 1

AN EXEMPLARY iWGP CONTENT REFERENCE DOCUMENT

```
- <HTML_GW_TRANSCODED_PAGE>
    <PAGE_INSTANCE_IDENTIFIER>A4BD71E0-772C-40F6-9BCE-
    F6DAFC5346F3</PAGE_INSTANCE_IDENTIFIER>
    <MASTER_URL>www.msn.com/walledgraden</MASTER_URL>
    <TRANSCODE_TIME>04/30/2002 17:38:00</TRANSCODE_TIME>
    <PICTURE_QUALITY>HI</PICTURE_QUALITY>
    <PICTURE_PRIORITY>MED</PICTURE_PRIORITY>
    <APPLICATION_ID>OrgID.AppID</APPLICATION_ID>
    <TRACKING_DATA>NC=132 WW=AB QQ=R2D2</TRACKING_DATA>
- <IMAGE>
    <LINK LINK_IDENTIFIER="">
    <SOURCE_URL>www.msn.com/specials/summertime.gif</SOURCE_URL>
    <TRACKING_DATA>RR=ABC EE=347</TRACKING_DATA>
    </IMAGE>
- <IMAGE>
    <LINK_IDENTIFIER="1">
    <SOURCE_URL>www.msn.com/specials/beachware.gif</SOURCE_URL>
    <TRACKING_DATA>RR=ABC EE=3413</TRACKING_DATA>
    </IMAGE>
- <LINK LINK_IDENIFIER="0">
    <TRACKING_DATA >RR=ABE EE=2304</TRACKING_DATA>
    <LINK_HREF>www.msn.com/specials/umbrellaspecial.htm</LINK_HREF>
    </LINK>
- <LINK LINK_IDENTIFIER="1">
    <TRACKING_DATA>RR=ABQ EE=9304</TRACKING_DATA>
    <LINK_HREF>www .msn.com/specials/suntanoil.htm</LINK_HREF>
    </LINK>
    </HTML_GW_TRANSCODED_PAGE>
```

Figure 2:
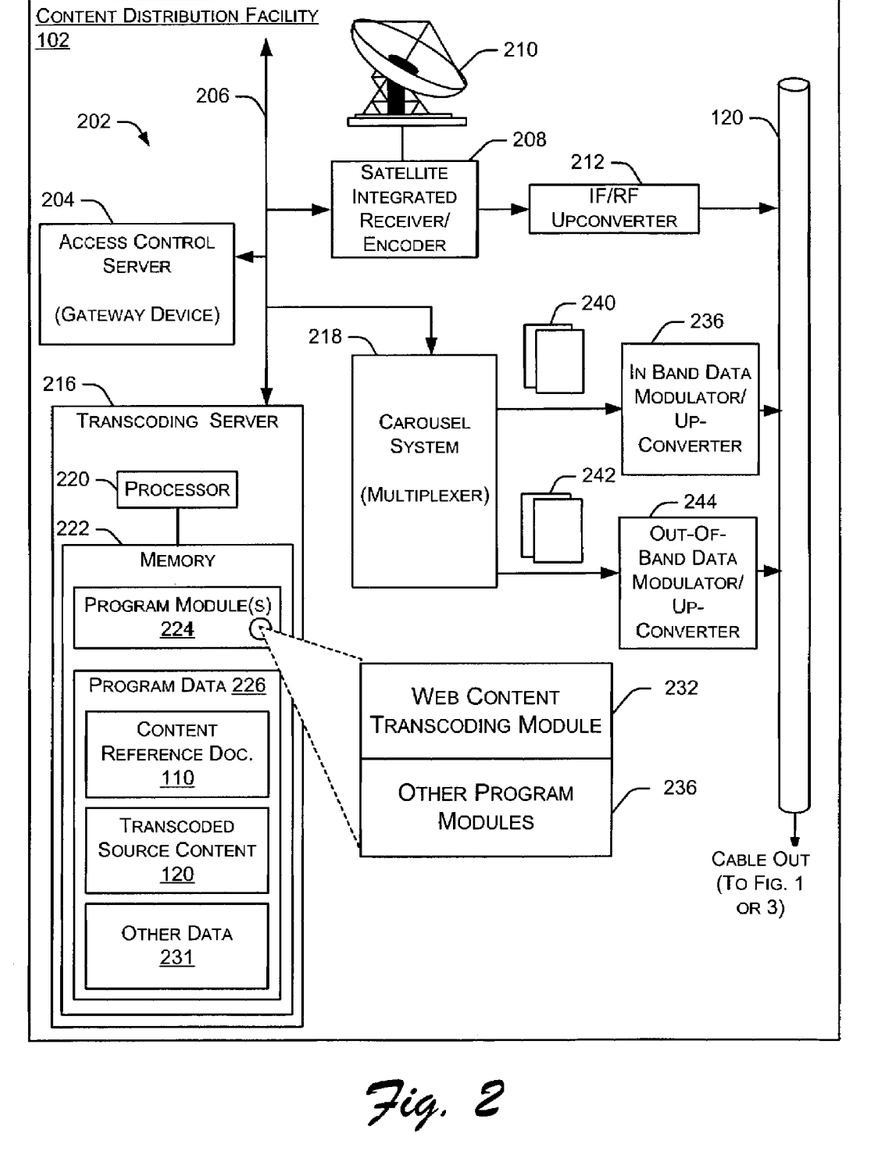

Exemplary elements of the content reference document 110 of TABLE 1 include, for instance, the following:

PAGE_INSTANCE_IDENTIFIER(s) (i.e., generated and assigned page IDs) is a substantially unique identifier, or GUID assigned by the CDF gateway device (access control server 204 of FIG. 2).

MASTER_URL is the master Universal Resource Locator (URL) for the Web content 104 (FIG. 1).

TRANSCODE_TIME is the timestamp generated by the download/transcode server 216 (FIG. 2) at transcode time.

PICTURE_QUALITY and PICTURE_PRIORITY are attributes assigned by the source content developer and extracted by the download and transcode server 216 from the HTML source page.

APPLICATION_ID the DVB application ID assigned to the iWGP 120. This is an MPEG server configuration parameter.

TRACKING_DATA contains information extracted by the server 216 from the Web content 104 regarding a Web page as a whole, an image or links within the page, and so on. The source content author has a substantial amount of freedom to put whatever type of information that is considered to be relative to tracking for parsing into the content referencing document.

IMAGE is a tag used to identify context information corresponding to any one of potentially many images present in a page of Web content. During Web content transcoding operations, the content reference document is populated with information extracted from the source Web content regarding each image on a Web page. Such information can be just about any type of information of interest to Web content authors and administrators.

LINK is a tag used to identify one of the potentially many URL or navigable links (e.g., a hypertext link) present on a page of Web content. The link may reference content within or outside of a Web page. The content reference document contains information extracted from the source content regarding each link on a page. Images may themselves be hotspots and therefore may have a link ID ("LINK_IDENTIFER"), as in the case of the second image in the sample content reference document of TABLE 1. If an image contains no link, then the link ID is an empty string.

The CDF 102 sends content reference document 110 to a data center that includes at least data warehousing server 114. As described below, the extracted contextual characteristics of the content reference document 110 are not included into the metadata portion of the transcoded source content 120 that is sent to the client for end-user presentation and navigation.

CDF 102 broadcasts transcoded source content 120 (stills and interaction model metadata) over network 122 to any number of clients 118. For instance, the CDF can alternatively broadcast signals to client devices via wireless means such as so-called "wireless cable" broadcasts, digital satellite communication, and so on. The network includes any combination of terrestrial, satellite, and/or digital hybrid/fiber coax networks. The clients include, for example, computing devices with processors coupled to memory such as volatile and non-volatile memory. In one implementation, a client is a set-top box either coupled to or incorporated into a television viewing device.

A navigator application 124 on a client 118 decodes, presents, and facilitates navigation of the rich interactive interface content provided by received transcoded source content 120 (e.g., an iWGP). When an end-user at the client views and navigates transcoded source content, the end-user is only "logically" viewing and navigating corresponding Web content. This is because the end-user is not really viewing and navigating the Web content, rather the end-user is actually presenting and selecting respective ones of the still images and hotspots as defined by the interaction model metadata (the stills, hotspots, and interaction model having been transcoded or generated from and representing the Web content).

As the end-user presents respective stills and selects individual hotspots, the navigator 124 records corresponding ones of the page and link IDs as indicated by the interaction model metadata. These page and link IDs are recorded to an event tracking log 126. When a hot spot is selected, the page ID is recorded along with the link ID to identify the particular page on which the link resides. This is because, in this implementation, even though page IDs are globally unique, link IDs are only unique within the scope of the page to which they correspond.

The client 118 uploads the event tracking log 126 to the data warehouse server. In one implementation, the client (e.g., part of an opt-in subscriber base) uploads the event tracking log automatically according to any number of upload criteria or responsive to receipt of a polling request 128. Such criteria include, for example, threshold use of client logging memory, time and/or activity based criteria, and so on. The uploaded event tracking log is represented as one or more electronic messages 130.

Event tracking logs 126 are relatively small in size and do not require very much bandwidth to send to the data warehouse 114. This is in part because they do not include Web page or navigable link context information with respect to the page and link IDs that have been recorded. (Such context information is in the content reference document 110 maintained by the data warehouse). Accordingly, data throughput limitations of communications pathways over which event tracking logs are communicated are not likely to be overextended.

Subsequent to receiving the uploaded event tracking log 130, the data warehousing server 114 reconciles the logged page and link ID(s) to with corresponding contextual characteristics from the content reference document 110 to generate a report 116. Since context of the event tracking log data is not provided by the client 118, but rather by the data warehouse, client(s) do not need to utilize valuable processing, memory, and/or data resources to maintain, map, and distribute such contextual information.

The report 116 represents collected, organized, and persisted client content viewing/navigation activities at one or more client(s) 118. This means that the data warehouse 114 can aggregate the event tracking logs to generate compilations of end-user activities from any number of client devices. Additionally, the content reference document 110 is essentially a table of contents for the transcoded Web content 120. Thus, the data warehouse 114 can implement flexible, extensible, and configurable end-user content presentation and navigation tracking business models when generating a report 116.

For example, responsive to end-user presentation of a particular transcoded still, a single page ID is written by the client to the event tracking log 126. When reconciling the information in the event tracking log with contextual characteristics from the content reference document, the data warehouse can identify each other element encapsulated by the particular Web page identified by the page ID. Such other elements include all of the images and navigable links on the particular Web page, along with the context information corresponding to each of these elements. With such comprehensive information, the data warehouse can specify that an "implied impression" has been made for each link and image represented by the particular transcoded still.

In this exemplary implementation, the data warehouse 114 includes an embedded Web server 132 to provide a Web service to publish report(s) 116 to external sources such as authorized end-users, applications, etc. In this manner, the data warehouse serves as an information source providing added value for administrative entities, source content suppliers, and so on.

Although CDF 102 of FIG. 1 is described in this exemplary implementation as dynamically transcoding Web content 104 to MPEG stills and interaction model metadata (transcoded source content 120), such dynamic conversion is only one example of a suitable procedure to obtain MPEG stills and metadata to logically present Web content to an end-user. For instance, the CDF may receive manually generated stills and interaction model metadata from an external data source 106 that can be used at a set-top box for mimicking presentation and behavior models of Web content. Techniques to manually generate stills and metadata is described in U.S. Pat. No. 6,317,885 to Fries, titled "Interactive Entertainment and Information System Using Television Set-top Box", commonly assigned hereto, and which is hereby incorporated by reference. However, if the stills and metadata are manually generated, the content author must also insert substantially unique page and link IDs into the interaction model metadata, and generate a content reference document 110 having the same page and link IDs mapped to content characteristics, as described above.

An Exemplary Content Distribution Facility

FIG. 2 is a block diagram showing further aspects of the exemplary computing environment of FIG. 1. In particular, FIG. 2 shows one implementation of the content distribution facility (CDF) 102 of FIG. 1. In this implementation, the CDF is designed as a cable-head-end to broadcast digital and optionally analog content to subscribers. CDF 102 contains local area network (LAN) 202, including an access control server 204 for controlling the operation of CDF components over communication path 206 (e.g., an Intranet implementing Ethernet). In this implementation, the access control server is a gateway between external data source(s) 106 (FIG. 1) and the CDF.

A satellite integrated receiver/encoder 208, receives and encodes digital television programming signals such as those originating from microwave broadcasts received via satellite antenna (dish) 210. In turn, the MPEG2-encoded transport streams are received by an intermediate frequency to radio frequency (IF/RF) up-converter 212. The frequency up-converter modulates the MPEG2-encoded transport streams onto analog channels and injects the signals onto the broadcast network, which in this implementation is illustrated as HFC network 122 (FIG. 1).

Transcoding server 216 is coupled across communication path 206 (e.g., Ethernet) to local LAN 202. The transcoding server includes processor 220 coupled to memory 222. The memory includes volatile (i.e., random access memory (RAM)) and/or non-volatile memory. The memory comprises program modules 224 and program data 226. Program modules typically include routines, programs, objects, components, and so on, for performing particular tasks or implementing particular abstract data types. The processor is configured to fetch and execute computer program instructions from the program modules portion of memory, and further configured to fetch data from program data portion of the memory while executing the program modules.

In this implementation, program modules 224 include Web content transcoding module 232, which is often referred to below simply as the "transcoding module", and other program modules 236 such as an operating system to provide a run-time environment. The transcoding module transcodes Web content 104 into stills and corresponding interaction model metadata, which collectively represent transcoded source content 120. During the transcoding process, the transcoding module extracts contextual characteristics from the Web content and maps these extracted features to corresponding ones of the page and/or link IDs; the page and link IDs were generated and assigned to respective ones of the pages and links by the access control server 204. The mapped contextual characteristics form the content reference document 110.

The transcoding module 232 delivers the transcoded source content 120 to carousel file system 218 for subsequent injection over broadcast network 122 to the clients 118 (FIG. 1). The transcoding module forwards the generated content reference document(s) 110 to the data warehousing server 114 (FIG. 1) for subsequent reconciling with event tracking log(s) 126 (FIG. 1) that are subsequently received by the data warehouse from one or more clients 118.

Figure 3:
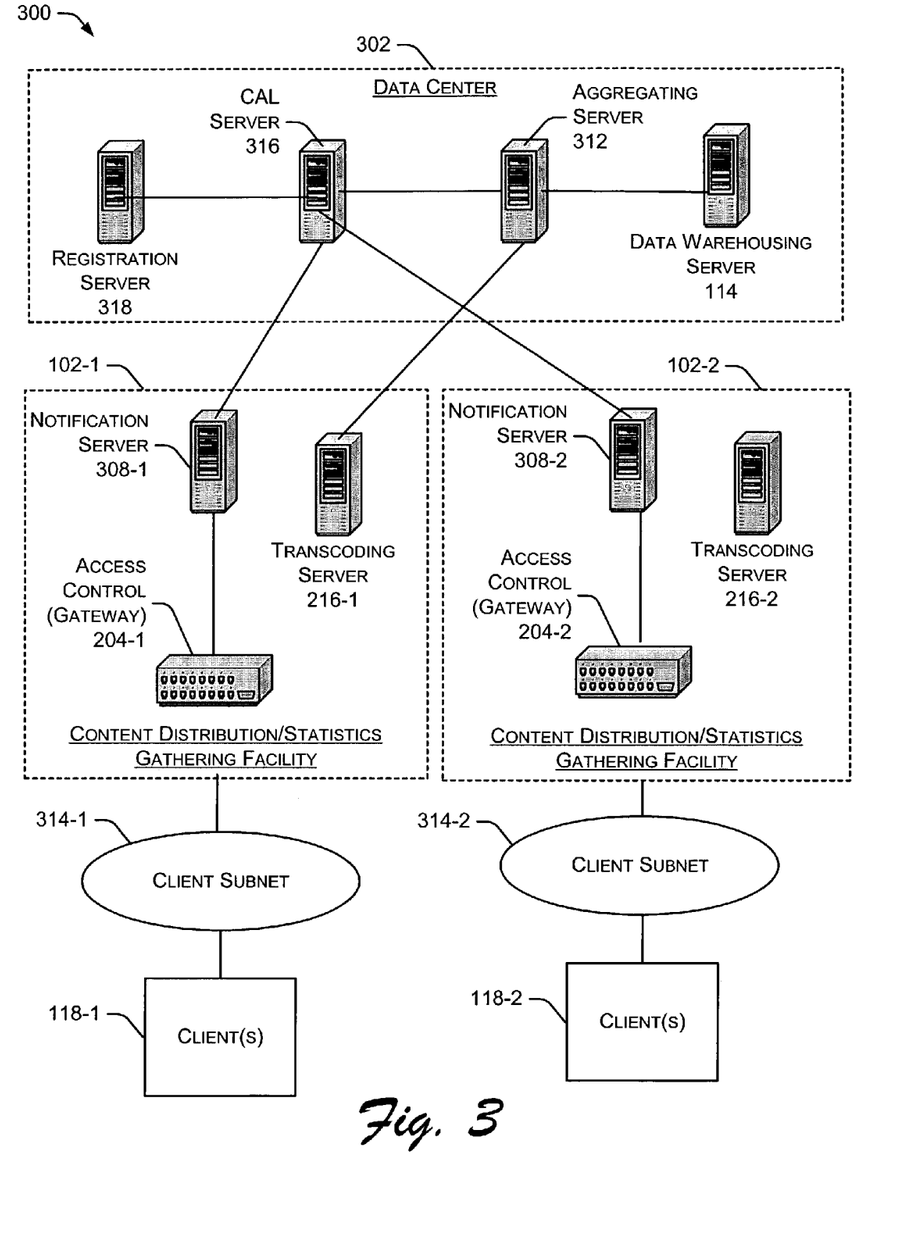
FIG. 3 shows an exemplary computing environment with a data center for aggregation of client logging information from clients coupled to any number of client subnets.

FIG. 3 shows an alternate implementation of the exemplary computing environment 100 of FIG. 1. In particular, FIG. 3 shows an exemplary IS architecture 300 with end-to-end logging via data center 302 for tracking and aggregation of end-user content use information from clients 118 coupled to any number of client subnets 304. As in the previous described figures, the same numbers are used throughout the drawings to reference like features and components. Where multiple substantially similar types of components are illustrated (e.g., at least two of a particular server type, etc.), the substantially similar components are described as a group by referring to only the first three (3) digits of each component type. For instance, in the implementation of FIG. 3, the data center 302 is coupled to multiple content distribution facilities ("CDFs") 102, as show by CDFs 102-1 and 102-2 of FIG. 3.

The data center 302 includes, for example, a registration server 318, an aggregating server 312, a data warehousing server 114, and a client activity logger (CAL) server 316. The registration server 318 maintains subscriber configuration data, which for example, includes identities (e.g., IP address and unit ID) of opt-in clients 118, client association(s) with various CDF 102 and application elements (e.g., an ID associated to a unique upstream and downstream path, a gateway subnet mask, and so on). The registration server may import at least portions of this data from a Multiple Systems Operator (MSO) for provision to other components. Each of the other data center components is now described with respect to the operations of the different components in each of the one or more CDFs 306.

In this implementation, each CDF 102 includes the following respective components: an access control device or gateway 204, a transcoding server 216, and a notification server 308. Additionally, although not shown in FIG. 3, one or more CDFs 102 of FIG. 3 may include data reception and broadcast infrastructure such as described above with respect to FIG. 2. Transcoding servers 216 of FIG. 3 perform Web content 104 (FIG. 1) transcoding and content reference document 110 (FIGS. 1 and 2) generation and distribution as described above with respect to FIGS. 1 and 2, with the exception that the content reference document is communicated to aggregating server 312 for subsequent distribution to the data warehouse server 114. A centralized aggregating server allows the data center 302 to collect content reference document(s) 110 created by one or more transcoding servers 216 in a single location for provisioning the data warehouse.

In this implementation, each CDF 102 includes a respective notification server 308 to provide reliable communication channel(s) between data center 302 and client(s) 118. Notification server 308 supports one-way and request-response messaging between data center 302 and respective clients 118 coupled to the associated subnet(s). It enforces bandwidth and time window constraints for each service channel. Notification server uses a pool of dispatchers, where each dispatcher serializes requests for all clients serviced by a CDF 102. This provides an optimized usage of bandwidth and at the same time avoids collisions. Each notification server 308 is coupled to and communicates with respective client(s) 118 via a respective gateway 204.

Client activity logger (CAL) 316 in the data center 302 works in conjunction with notification servers 308 to upload and record one or more client activity logs 126 for import into the data warehouse 114. In one implementation, based upon a configured polling schedule, CAL polls at least a portion of clients 118 to request upload of their respective activity logs via a respective notification server. This action is performed by sending a single asynchronous upload request to the respective notification server(s) 308 for its associated opt-in clients.

Responsive to receiving such a request, the client 118 uploads the event tracking log(s) 126 to the notification server 308 via a respective gateway 204. The notification server forwards such responses the CAL server 316. CAL then sends the response(s) directly to the data warehouse after first decrypting the payload (if necessary) and hashing the MAC address. The data warehouse reconciles the recorded event tracking log IDs to with data in the content reference document 110 to provide contextual information to the actual Web content of interest to the end-user. The reconciled end-user content use activities are made available to authorized end-users and applications by the data warehouse.

It can be appreciated that rather than polling the client to request upload of an event tracking log, the client can also be configured to automatically upload event tracking log according to some criteria such as upon reaching a threshold amount of client logging memory use, a periodic time-based criteria, activity based criteria, and so on.

The CAL 316 provides additional services via respective ones of the notification servers 308. For example, CAL or the notification server may initiate service requests to one or more of the client(s) 118. Such service requests include, for instance, commands to: enable/disable logging at the client, set the desired size of the event tracking log, verify client MAC address, topology reset (forces client 118 to re-register with notification server 308 (FIG. 3)), flush the event tracking log, and so on. In this implementation, each service request is processed by the client in a FIFO order. Client response(s) such as success/failure status, log reports, and so on, are sent back to the requestor.

Figure 4:
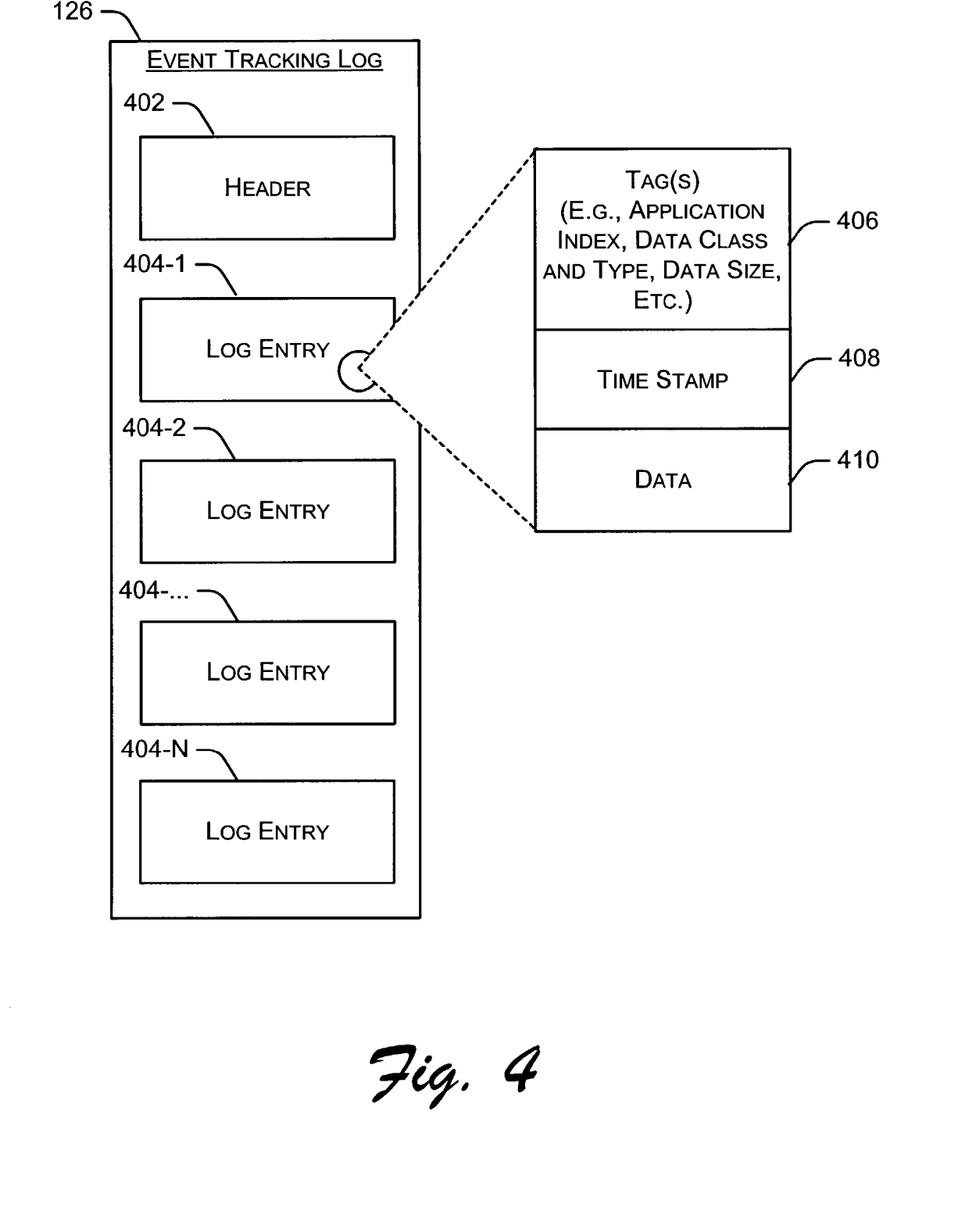
FIG. 4 is a block diagram of an exemplary event tracking log. The event tracking log is used by the client device to cache a substantially minimal amount of end-user content presentation and selection event-based information at the client.

FIG. 4 shows a block diagram of an exemplary client event tracking log 126. The event tracking log is used by the client device to cache a substantially minimal amount of end-user content presentation and selection event-based information at the client. The event tracking log includes, for example, header 402 and one or more log entries 404 (e.g., 404-1 through 404-N). The size of the event tracking log can be programmatically increased and decreased. The header includes information used by the data warehouse 114 (FIGS. 1 and 3), notification server 308 (FIG. 3), and/or aggregating server 312 (FIG. 3)) and information used by client 118 (i.e., log manager 510 of FIG. 5) for state and event tracking log management. The header includes, for example, the following information: (a) time of the most recent system (client 118) boot; (b) time when the logging buffer was created; (c) time when a first log entry 404 was discarded due to event tracking log overflow; (d) time when a last log entry was discarded due to event tracking log overflow; and (e) total count of log entries discarded; log format version, base system time.

Client 118 concatenates log entries 404 to the end of event tracking log 126 as data is logged. Each log entry includes, for example tag(s) 406, time stamp 408, and data 410. The tag data field consists of a set of data specific to each log entry. This data is used to both identify the particular application and version (i.e., a program module 506 of FIG. 5) logging the data, and to characterize data 410. Such data characterizations include, for example, an application index, a data class indication, a data type indication, and a data size indication. The application index of the tag data field contains a reference to the application index in the client's log manager's application lookup table (i.e., "other data 520 of FIG. 5). The application lookup table includes, for example, an application ID to identify the specific program module and version that is tracking end-user content use. This application ID is used by both the client's log manager (i.e., log manager 510 of FIG. 5) and data warehouse 114 (FIGS. 1 and 3).

The data class indication of the tag data field 406 is used for applications to indicate the specific type of information/event(s) being logged. For example, a walled garden implementation (e.g., navigator 124 presenting transcoded source content 120) may wish to denote some log entries 404 as page views while denoting other entries as click-throughs to facilitate filtering and sorting at data warehouse 114 (FIGS. 1 and 3). The data type indication of the tag data field 406 indicates whether data 410 indicates application specific information (e.g., a channel change or an error such as a failed channel change). The data size of the tag data field indicates the size of data 410.

Time stamp 408 is the least significant word in the 32-bit time stamp of the log entry. Combining this low-order word with the upper 16-bits provided by the base time identified in header 402 (or most recent base time (MSW) entry) provides an absolute log time reference.

Data 410 is the data specific to the particular log entry and will generally follow a pre-defined data format for the specific application tracking the user events (i.e., a program module 506) and type or class of information being logged (application defined/specific).

An Exemplary Client Logging Architecture

Figure 5:
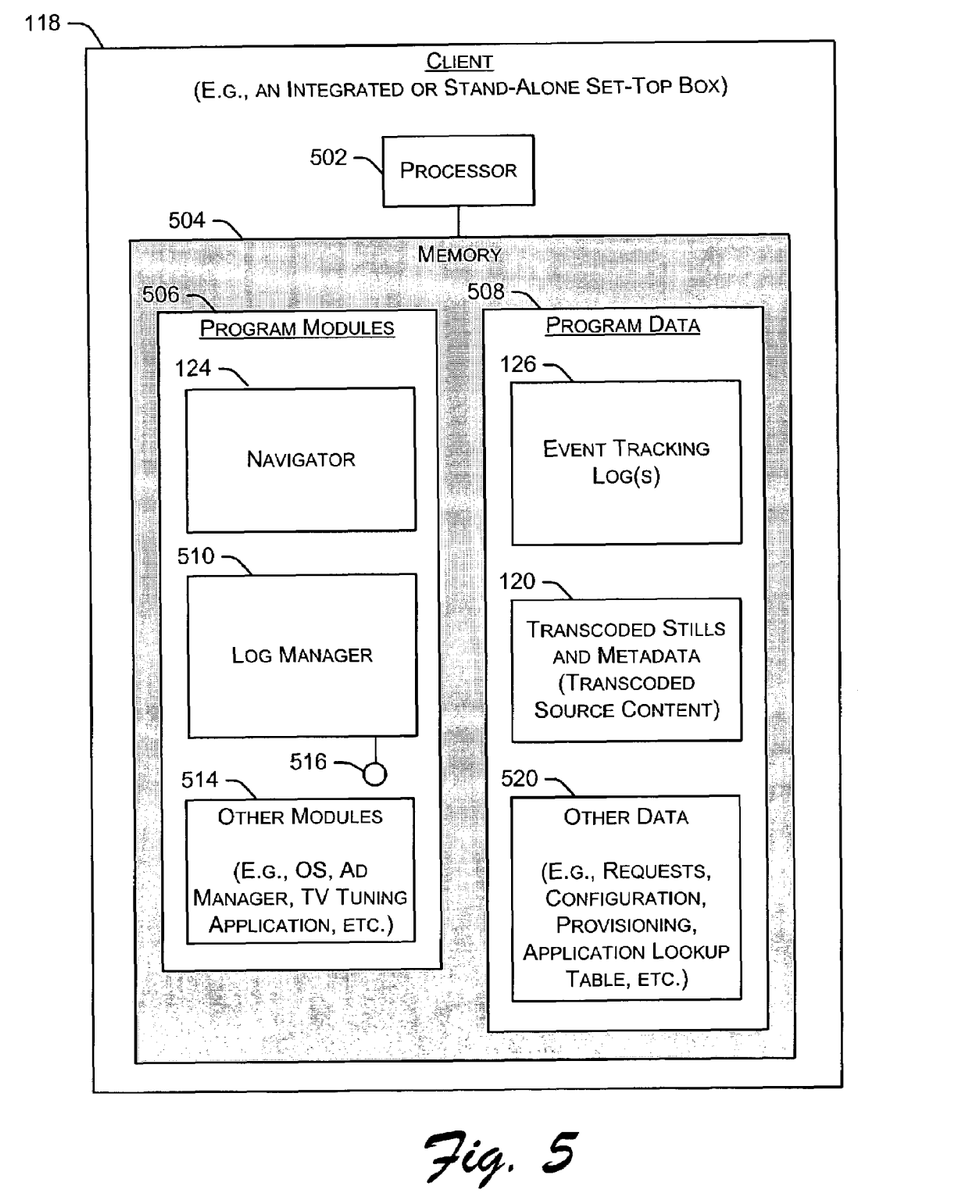
FIG. 5 shows an exemplary client of FIGS. 1 and 3 to generate and distribute event logs of FIG. 4 to a remote third party entity such as a data center or a data warehousing server.

FIG. 5 shows an exemplary client 118 (FIGS. 1 and 3) to generate and distribute event logs 126 (FIG. 4) to a remote third party entity such as a data center or a data warehousing server. Since the event logs consist of only a minimal amount of event-based information such as numeric page and link IDs, the event logs are reconciled by the third party entity in view of contextual characteristics of Web content that is mapped by the third party entity to such page and link IDs. To this end, the client represents a source of logging data for the third party entity. Clients may be respectively implemented as one or combinations of different types of data servers such as set-top boxes, HTML gateways, content and advertisement targeting systems, hand-held devices, multiprocessor systems, microprocessor based or programmable consumer electronics, network PCs, minicomputers, mainframe computers, portable communication devices, and so on.

Each client 118 includes processor 502 coupled to memory 504. The memory includes volatile (i.e., random access memory (RAM)) and/or non-volatile memory. The memory includes program modules 506 and program data 508. Program modules typically include routines, programs, objects, components, and so on, for performing particular tasks or implementing particular abstract data types. The processor is configured to fetch and execute computer program instructions from the program modules portion of the memory, and further configured to fetch data from the program data portion of the memory while executing the program modules.

Program modules 506 include navigator 124, log manager 510, and other program modules 512 such as an operating system to provide a run-time environment on client 118. The log manager exposes application programming interface (API) 516 to allow registered applications to log end-user content viewing, navigation, and use events to tracked event log 126 (see also, FIGS. 1 and 4). A registered application is manually or programmatically registered/identified in a configuration data file (e.g., see "other data" 520). Such registered applications include the navigator, ad manager 214, and so on. Tracked events include transcoded source content 120 viewing, navigation, user click-through, advertising page views and impressions, games usage data, detailed television viewing information, and/or the like. Responsive to receiving a poll request 128 (FIG. 1) from a data warehouse server 114 (FIG. 1) or other server (e.g., notification server 308 of FIG. 3), the log manager uploads or commits the tracked events stored in event tracking log 126 the requesting server.

Responsive to receiving a cease logging request (one variety of poll request message 128 of FIG. 1), log manager 510 turns off logging operations (does not track end-user content use events). At this point, the log manager may free any allocated logging buffers (E.g., log entry 404 of FIG. 4), and thereby, increase the amount of memory available for use by other applications. The cease logging request may originate, for example, via user request forwarded from a program module such as from navigator 124 or any "other module" 514. In one implementation, data warehousing server 114 (FIG. 1) or data center 302 (FIG. 3) may send the cease logging request when client 118 is not expected to upload log data to the back-end servers, either because the end-user has not opted-in for logging, because it has been decided that the client will not take part in a particular log polling sample, and so on.

Just as log manager 510 may be directed to cease logging operations via API 516 and/or via poll request 128 (FIG. 1), the log manager may be directed to start or resume logging operations. This can be accomplished via API 516 and/or responsive to receipt of a start/resume logging request (one variety of poll request message 128 of FIG. 1). Responsive to being directed to start/resume logging operations, the log manager stores received end-user content use events to event tracking log 126.

API 516 further provides for dynamically creating, flushing and increasing or decreasing the size of event tracking log(s) 126 at run-time. In one implementation, responsive to receiving an up-load request, log manager 510 passes current event tracking log (event tracking log) 126 to an external agent such as notification server 308 (FIG. 3) for subsequent uploading to data warehousing server 114 (FIGS. 1 and 3). At this point, the log manager creates a new event tracking log 126 for newly received end-user content viewing/navigation event storage.

An Exemplary Procedure

Figure 6:
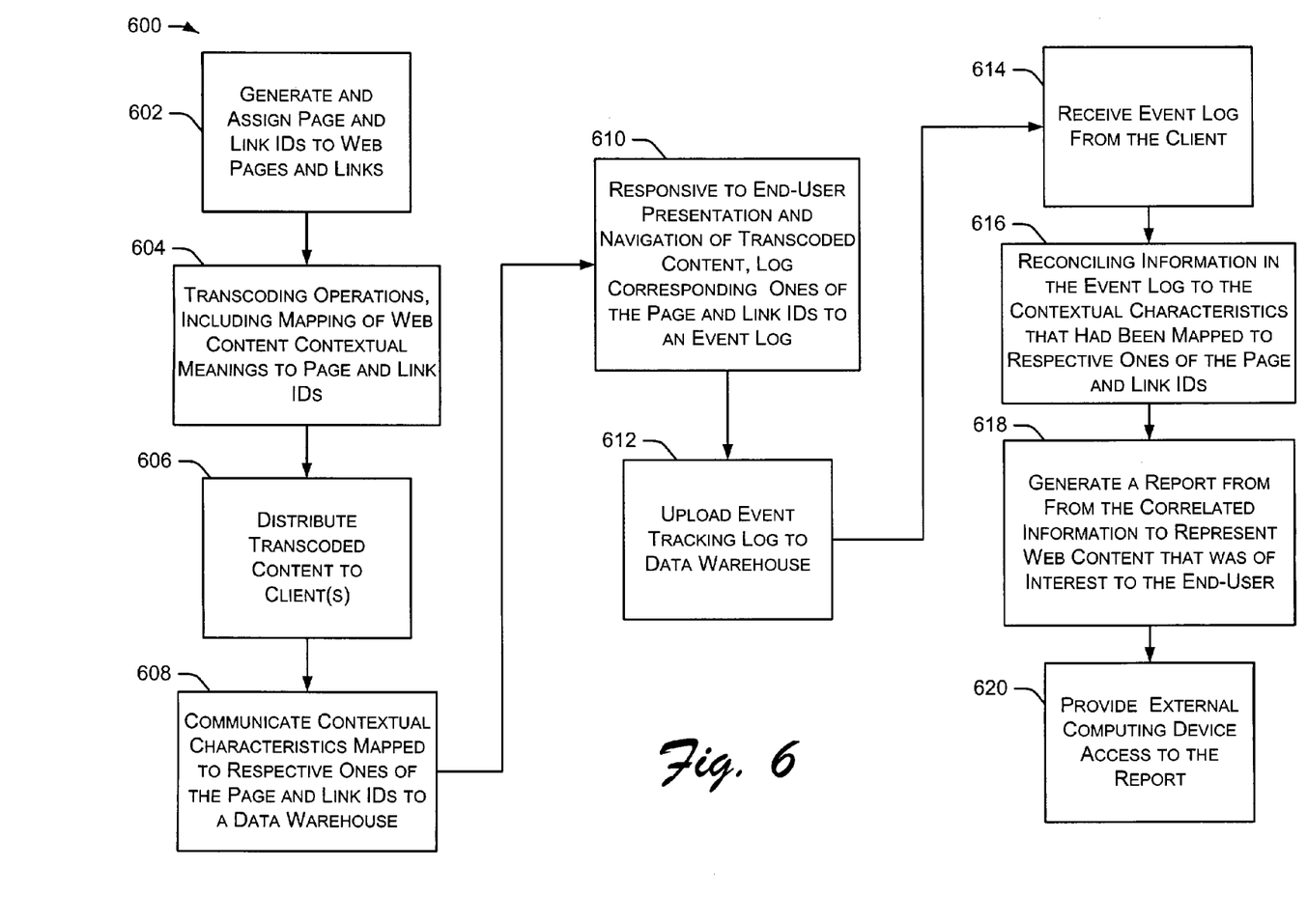
FIG. 6 shows an exemplary procedure to track end-user content viewing and navigation in a distributed computing environment.

FIG. 6 shows an exemplary procedure 600 to track end-user content viewing and navigation. For purposes of discussion, transcoding, client logging and data warehousing operations are described with respect to FIG. 6. At block 602, substantially unique page and link IDs are generated and assigned to respective ones of Web content pages and navigable links. In one implementation, this operation is performed responsive to receipt of Web content 104 (FIG. 1) by a gateway 204 (FIGS. 2 and 3) in a content distribution facility 102 (FIGS. 1, 2, and 3). At block 604, the Web content is transcoded into stills and interaction model metadata (i.e., transcoded source content 120 of FIGS. 1 and 2). The stills represent respective Web page images. The interaction model metadata identifies hotspot locations and interaction information corresponding to each navigable link on a Web page.

At block 604, a content reference document 110 (FIGS. 1-2 and TABLE 1) is generated from the Web content during transcoding operations. The content reference document maps contextual meaning/characteristics to each of the stills and hotspots in the transcoded Web content 120 (FIGS. 1 and 2). This mapping is accomplished by association of the contextual meaning to corresponding ones of the generated page and link IDs (block 602). At block 606, the transcoded source content is distributed to one or more client computing devices 118 (FIGS. 1 and 5). Although, the interaction model metadata includes the generated page and link IDs, the metadata does not include the contextual characteristics that were extracted from the Web content for insertion into the content reference document during transcoding operations. Thus, the metadata sent to the client includes only that minimal amount of information needed by the client to present and navigate the stills and hotspots in the transcoded source content. At block 608, the content reference document 110 (FIGS. 1 and 2) is communicated to the data warehouse 114 (FIGS. 1 and 3).

At block 610, subsequent to receiving the transcoded source content 120 (FIGS. 1 and 2), and responsive to end user presentation of a still and/or selection of a hotspot, the client the client 118 (FIGS. 1, 3, and 5) logs corresponding ones of the page and/or link IDs to event tracking log 126 (FIGS. 1 and 4). The stills and hotspots are supplied at the client via respective portions of the transcoded source content. At block 612, the client uploads the event tracking log to a data warehouse 114 (FIGS. 1 and 3). The client uploads the event tracking log automatically according to any number of upload criteria and/or responsive to receipt of a polling request 128 (FIG. 1). In one implementation, the client uploads the event tracking log to the data warehouse via notification 308 and aggregating servers 312 (FIG. 3).

At block 614, data warehouse 114 (FIGS. 1 and 3) receives the event tracking log from the client 118 (FIGS. 1, 3, and 5). At block 616, the data warehouse reconciles each page and link ID in the event tracking log to corresponding ones of the contextual characteristics in the content reference document 110 (FIGS. 1, 2, and Table 1). This reconciled information indicates exactly those Web pages and navigable links of that were of interest to the end-user. Since the logged page and link IDs are reconciled with meaning at the data warehouse, content authors and administrators can track end-user navigation and presentation of Web content without concern of overextending the client's processing, memory, and/or data storage resources.

At block 618, the data warehouse 114 (FIGS. 1 and 3) generates a report 116 (FIG. 1) from reconciled end-user content use information. At block 620, the data warehousing server provides external computer access to the report, for example, via an embedded Web server 132 (FIG. 1) and a corresponding Web service.

CONCLUSION

Systems, apparatus, and methods for tracking end-user content use in a distributed computing environment are described Although the systems, apparatus, and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. In a distributed computing environment, a method to track end-user Web content viewing and navigation, the method comprising:
   generating a document for communication to a data warehouse, the document being generated during Web content transcoding operations, the document comprising:
      contextual characteristics of Web content interface pages and links within scope of respective ones of the interface pages, and
      identifiers (IDs) that identify the contextual characteristics of specific ones of the interface pages and links;
   distributing transcoded source content representing a Web content to a client, the client being responsive to end-user presentation and navigation of the transcoded source content by recording corresponding ones of the IDs to a log for subsequent uploading to the data warehouse, the data warehouse being configured to map particular ones of the contextual characteristics to corresponding uploaded log recorded IDs to identify specific ones of the interface pages and the links accessed by an end-user,
   wherein the contextual characteristics comprise one or more of a master URL for a page of the interface pages, a source URL for an image embedded in the page, a link URL for a link within scope of the page, and a private identifier for an object on the page, context of the private identifier only being understood by a content author or administrative entity.

2. The method of claim 1,
   wherein the contextual characteristics comprise content author specific tracking information, and
   wherein the method further comprises reconciling the content author specific tracking information with the IDs recorded in the log to provide added value to content authors.

3. The method of claim 1, wherein the IDs in the log do not provide enough information by themselves to reconcile end-user content viewing and navigation at the client.

4. The method of claim 1, wherein the transcoded source content comprises stills and hotspots, wherein each still replaces a Web content interface page, and each hotspot replaces a link on the Web content interface page.

5. The method of claim 1, wherein the interface pages are HTML Web pages.

6. The method of claim 1, wherein the distributed computing environment is an interactive television entertainment system.

7. The method of claim 1, wherein the client is a Cable television set-top box that is provisioned by a headend.

8. The method of claim 1, wherein the method further comprises polling the client to cause the client to upload the log to the data warehouse.

9. A computer-readable storage medium comprising computer-program instructions to track end-user content viewing and navigation, the computer program instructions comprising instructions executable by a processor for:
   identifying, by a content distributor, content characteristics of images and hypertext links in Web content; and
   distributing, by the content distributor, stills and metadata corresponding to the Web content to a client,
      the metadata comprising substantially unique identifiers (IDs) that map to respective ones of the images and links,
      the client being configured, responsive to end-user presentation and navigation of interface objects provided by the stills and metadata, to record corresponding ones of the identifiers to a log,
      the client further being configured to upload the log to a data warehouse for reconciling the corresponding ones in view of the content characteristics to determine Web content of interest to an end-user.

10. The computer-readable storage medium of claim 9, wherein the client is further configured to map the corresponding ones of the identifiers to actual Web content of interest to the end-user.

11. The computer-readable storage medium of claim 9, wherein the content characteristics comprise a master URL for the Web content, a source URL for an image on a Web page, a link URL for a link on the Web page, and tracking data.

12. The computer-readable storage medium of claim 9, wherein the content distributor is part of an interactive television entertainment system.

13. The computer-readable storage medium of claim 9, wherein the client is a set-top box.

14. The computer-readable storage medium of claim 9, further comprising computer-program instructions for polling the client to cause the client to upload the log to the data warehouse.

15. A transcoding server for tracking end-user content viewing and navigation, transcoding server comprising:
   a processor; and
   a memory coupled to the processor, the memory comprising computer program instructions executable by the processor for:
      identifying content characteristics of Web content; and
      distributing data representing the Web content to a client device, the client device being configured, responsive to presentation and navigation of interface objects provided by the data, to record identifiers to a log identifier, the identifiers substantially uniquely identifying respective ones of the interface objects presented and/or navigated by an end-user, the client device further being configured to upload the log to a data warehouse, the data warehouse being configured to reconcile the identifiers in view the content characteristics to determine Web content of interest to the end-user.

16. The transcoding server of claim 15, wherein the content characteristics comprise a master URL for the Web content, a source URL for an image on a Web page, a link URL for a link on the Web page, and tracking data.

17. The transcoding server of claim 15, wherein the transcoding server is in a head-end of an interactive television entertainment system.

18. The transcoding server of claim 15 wherein the client device is a Cable television set-top box that is provisioned by a head end.

19. The transcoding server of claim 15, further comprising computer-program instructions for polling the client device to cause the client device to upload the log to the data warehouse.

20. In a distributed computing environment, a computing device to track end-user Web content viewing and navigation at a remote client, the computing device comprising:
 means for generating a document for communication to a data warehouse, the document comprising: contextual characteristics of interface pages and links within scope of respective ones of the interface pages, and identifiers (IDs) that identify the contextual characteristics of specific ones of the interface pages and links;
 means for distributing data representing the interface pages and corresponding link interaction models to the remote client, responsive to end-user presentation and navigation of the data, the remote client being configured to record corresponding ones of the IDs to a log for subsequent uploading to the data warehouse, the data warehouse being configured to map particular ones of the contextual characteristics to corresponding uploaded log recorded IDs to identify specific ones of the interface pages and the links accessed by the end-user,
 wherein the contextual characteristics comprise one or more of a master URL for a page of the interface pages, a source URL for an image embedded in the page, a link URL for a link within scope of the page, and a private identifier for an object on the page, context of the private identifier only being understood by a content author or administrative entity.

21. In a distributed computing environment, a method to track end-user content viewing and navigation, the method comprising:
 receiving transcoded source content comprising stills and hotspots, and identifiers to uniquely identity each still and each hotspot, wherein each still replaces a page of Web content, and each hotspot replaces a Hypertext link on the page of Web content;
 responsive to end-user presentation a still of the stills, logging a corresponding still identifier to an event log;
 responsive to end-user selection of a hotspot of the hotspots, recording a corresponding hotspot identifier to the event log; and
 communicating the event log to a data warehousing server, where the identifiers in the event log are correlated with contextual characteristics of specific portions of Web content represented by the transcoded source content, such a correlation identifying at least one of actual Web pages and/or Hypertext links accessed by an end-user.

22. The method of claim 21, wherein receiving transcoded source content further comprises receiving transcoded source content at a client that is a Cable television set-top box provisioned by a headend.

23. The method of claim 21, wherein recording and logging further comprise:
 communicating an event to an exposed client logging application, the event corresponding to end-user selection and/or presentation of a hotspot or a still, the event providing data to substantially uniquely identify the hotspot or the still with respect to each different hotspot of the hotspots and each different still of the stills; and
 responsive to receiving the event, storing the data to the event log.

24. The method of claim 21, wherein communicating the event log is performed automatically according to one or more upload criteria, and/or performed responsive to receiving a request for upload.

25. A computer-readable storage medium comprising computer program instructions to track end-user content viewing and navigation, the computer-program instructions executable by a processor for:
 receiving transcoded source content comprising stills and hotspots and identifiers to uniquely identify each still and each hotspot, wherein each still replaces a source page of Web content, and each hotspot replaces a Hypertext link on the source page of Web content;
 responsive to end-user presentation of a still of the stills, logging a corresponding still identifier to an event log;
 responsive to end-user selection of a hotspot of the hotspots, recording a corresponding hotspot identifier to the event log; and
 communicating the event log to a data warehousing server, where the identifiers in the event log are correlated with contextual characteristics of specific portions of Web content represented by the transcoded source content, such a correlation identifying at least one of actual Web pages and/or Hypertext links accessed by an end-user,
 wherein the identifier for a still is globally unique and the identifier for each hotspot is only unique within the still.

26. The computer-readable storage medium of claim 25, wherein receiving transcoded source content further comprises receiving transcoded source content at a client that is a Cable television set-top box provisioned by a headend.

27. The computer-readable storage medium of claim 25, wherein the computer-program instructions for recording and logging further comprise instructions for:
 communicating an event to an exposed client logging application, the event corresponding to end-user selection and/or presentation of a hotspot or a still, the event providing data to substantially uniquely identify the hotspot or the still with respect to each different hotspot of the hotspots and each different still of the stills; and
 responsive to receiving the event, storing the data to the event log.

28. The computer-readable storage medium of claim 25, wherein the computer program instructions further comprise instructions for:
 receiving an upload request from a data center comprising the data warehouse; and
 responsive to receiving the upload request, uploading the event log to the data center.

29. The computer-readable storage medium of claim 28, wherein the upload request is communicated to a client computing device via an aggregation server in the data center, the aggregation server collecting client event tracking logs from multiple client domains for distribution to the data warehousing server.

30. In a distributed computing environment, a client computing device to track end-user content viewing and navigation of Web content, the client computing device comprising:
 a processor; and
 a memory coupled to the processor, the memory comprising computer-program instructions executable by the processor for:
  receiving transcoded source content comprising stills and hotspots and identifiers to uniquely identify each still and each hotspot;
  responsive to end-user presentation a still of the stills, logging a corresponding still identifier to an event log;

responsive to end-user selection of a hotspot of the hotspots, recording a corresponding hotspot identifier to the event log; and communicating the event log to a data warehousing server, where the identifiers in the event log are correlated with contextual characteristics of specific portions of Web content represented by the transcoded source content, such a correlation identifying at least one of actual Web pages and/or Hypertext links accessed by an end-user.

31. A client computing device of claim 30, wherein the client computing device is a Cable television set-top box provisioned by a headend.

32. A client computing device of claim 30, wherein the computer-program instructions for recording and logging further comprise instructions for:

communicating an event to an exposed client logging application, the event corresponding to end-user selection and/or presentation of a hotspot or a still, the event providing data to substantially uniquely identify the hotspot or the still with respect to each different hotspot of the hotspots and each different still of the stills; and responsive to receiving the event, storing the data to the event log.

33. The client computing device of claim 30, wherein the computer program instructions further comprise instructions for:

receiving an upload request from a data center comprising the data warehousing server; and responsive to receiving the upload request, uploading the event log to the data center.

34. In a distributed computing environment, a computing device to assist a data warehousing server to track end-user content viewing and navigation of content at the computing device, the computing device comprising:

means for receiving transcoded source content comprising stills and hotspots and identifiers to uniquely identify each still and each hotspot, wherein each still replaces a page of Web content, and each hotspot replaces a Hypertext link on the page of Web content;

responsive to end-user presentation of a still of the stills, means for logging a corresponding still identifier to an event log;

responsive to end-user selection of a hotspot of the hotspots, means for recording a corresponding hotspot identifier to the event log; and means for communicating the event log to a data warehousing server, where the identifiers in the event log are correlated with contextual characteristics of specific portions of Web content represented by the transcoded source content, such a correlation identifying at least one of actual Web pages and/or Hypertext links accessed by an end-user.

35. In a distributed computing environment, a method to track end-user content viewing and navigation on a remote client device, the method comprising:

receiving, by a data warehousing server, a content reference document from a content distribution facility, the content reference document providing a table-of-contents for a set of Web contents, the table-of-contents comprising Web content page and link identifiers (IDs), a list of Web content images, and Web content meta-tags;

receiving, by the data warehousing server, a list of logged page IDs and logged link IDs from the remote client device, the logged page and the logged link IDs corresponding to stills and hotspots viewed and/or selected by an end-user at the remote client device, the logged pages and link IDs representing at least a subset of the page and link IDs in the content reference document; and mapping the logged page IDs and the logged link IDs to corresponding ones of the page IDs and links IDs in the content reference document at the data warehousing server, the mapping identifying specific Web pages and navigable links from the Web content of interest to the end user.

36. The method of claim 35, wherein mapping further comprises:

determining that a specific Web page of the Web content was of interest to the end-user; and responsive to determining that the specific Web page was of interest, crediting the specific Web page and each element encapsulated by the specific Web page with a respective impression, encapsulated Web page elements comprising one or more of corresponding images and corresponding navigable links.

37. The method of claim 35, wherein the meta-tags comprise application specific tracking information that is relevant to a Web content author or administrator.

38. The method of claim 35, wherein the stills and hotspots represent an interactive walled garden program.

39. The method of claim 35, after the operation of mapping, the method further comprising providing a requestor with a report indicating the specific Web pages and navigable links of interest to the end user.

40. A computer-readable storage medium comprising computer-program instructions to track end-user content viewing and navigation, the computer program instructions comprising instructions executable by a processor for:

receiving, by a data warehousing server, a content reference document from a content distribution facility, the content reference document providing a table-of-contents for a set of Web contents, the table-of-contents comprising Web content page and link identifiers (IDs), a list of Web content images, and Web content meta-tags;

receiving, by the data warehousing server, a list of logged page IDs and logged link IDs from a remote client device, the logged page and the logged link IDs corresponding to stills and hotspots viewed and/or selected by an end-user at the remote client device, the logged pages and link IDs representing at least a subset of the page and link IDs in the content reference document; and mapping the logged page IDs and the logged link IDs to corresponding ones of the page IDs and links IDs in the content reference document at the data warehousing server, the mapping identifying specific Web pages and navigable links from the Web content being of interest to the end user.

41. A computer-readable storage medium of claim 40, wherein mapping further comprises:

determining that a specific Web page of the Web content was of interest to the end-user; and responsive to determining that the specific Web page was of interest, crediting the specific Web page and each element encapsulated by the specific Web page with a respective impression, encapsulated Web page elements comprising one or more of corresponding images and corresponding navigable links.

42. The computer-readable storage medium of claim 40, wherein the meta-tags comprise application specific tracking information that is relevant to a Web content author or administrator.

43. The computer-readable storage medium of claim 40, wherein the stills and hotspots represent an interactive walled garden program.

44. The computer-readable storage medium of claim 40, after the computer-program instructions for mapping, the computer program instructions further comprising instructions for providing a requestor with a report indicating the specific Web pages and navigable links of interest to the user.

45. The computer-readable storage medium of claim 40, after the computer-program instructions for mapping, the computer program instructions further comprising instructions for:
- aggregating specific Web pages and navigable links of interest to multiple end-users into a report; and
- providing the report to a requestor.

46. In a distributed computing environment, a data warehousing server to track end-user content viewing and navigation on a remote client device, the data warehousing server comprising:
- means for receiving a content reference document from a content distribution facility, the content reference document providing a table-of-contents for a set of Web content, the table-of contents comprising Web content page and link IDs, a list of Web content images, and Web content meta-tags;
- means for receiving a list of logged page identifiers (IDs) and logged link IDs from the remote client device at the data warehousing server, the logged page and the logged link IDs corresponding to stills and hotspots viewed and/or selected by an end-user at the remote client device, the logged pages and link IDs representing at least a subset of the page and link IDs in the content reference document; and
- means for mapping the logged page IDs and the logged link IDs to corresponding ones of the page IDs and links IDs in the content reference document at the data warehousing server, the mapping identifying specific Web pages and navigable links from the Web content being of interest to the end user.

47. A method for tracking user Web content viewing and navigation, the method comprising:
- identifying, by a content distributor, content characteristics of Web content interface pages and corresponding hypertext links;
- distributing, by the content distributor, data corresponding to a Web content to a remote client;
- responsive to user presentation and selection of interface objects provided by the data, recording by the remote client corresponding ones of a group of identifiers to a log, the corresponding ones being used to substantially uniquely identify presented and selected ones of the interface objects;
- uploading, by the remote client, the log to a data warehouse; and reconciling, by the data warehouse, identifiers recorded in the log in view of the content characteristics to determine Web content of interest to a user.

48. The method of claim 47, wherein the content distributor is a part of an interactive television network.

49. The method of claim 47, wherein the content characteristics are a content reference document comprising one or more of a master URL for accessing a Web page, an image URL to access an image of the Web page, a link URL for navigating from within the Web page, and proprietary Web content tracking information.

50. A method of claim 47, wherein reconciling further comprises:
- determining that a specific Web page of the Web content was of interest to an end-user; and
- responsive to determining that the specific Web page was of interest, crediting the specific Web page and each element encapsulated by the specific Web page with a respective impression, encapsulated Web page elements comprising one or more of corresponding images and corresponding navigable links.

51. The method of claim 47, wherein the data represented is an interactive walled garden program.

52. The method of claim 47, after reconciling, the method further comprising providing a requestor with a report indicating specific Web pages and navigable links of interest to one or more users.

53. A computer-readable storage medium comprising computer-program instructions to track end-user content viewing and navigation, the computer program instructions comprising instructions executable by a processor for:
- identifying, by a content distributor, content characteristics of Web content interface pages and corresponding hypertext links; and
- distributing, by the content distributor, data corresponding to a Web content to a remote client;
- responsive to user presentation and selection of interface objects provided by the data, recording by the remote client corresponding ones of a group of identifiers to a log, the corresponding ones being used to substantially uniquely identify presented and selected ones of the interface objects;
- uploading, by the remote client, the log to a data warehouse; and reconciling, by the data warehouse, identifiers recorded in the log in view of the content characteristics to determine Web content of interest to the end-user.

54. The computer-readable storage medium of claim 53, wherein the content distributor is part of an interactive television network.

55. The computer-readable storage medium of claim 53, wherein the content characteristics are a content reference document comprising one or more of a master URL for accessing a Web page, an image URL to access an image of the Web page, a link URL for navigating from within the Web page, and proprietary Web content tracking information.

56. The computer-readable storage medium of claim 53, wherein the data represented is an interactive Walled Garden Program.

57. The computer-readable storage medium of claim 53, wherein the computer-program instructions for reconciling further comprise instructions for:
- determining that a specific Web page of the Web content was of interest to the end-user; and
- responsive to determining that the specific Web page was of interest, crediting the specific Web page and each element encapsulated by the specific Web page with a respective impression, encapsulated Web page elements comprising one or more of corresponding images and corresponding navigable links.

58. The computer-readable storage medium of claim 53, after the computer-program instructions for reconciling, the computer program instructions further comprising instructions for providing a requestor with a report indicating specific Web pages and navigable links of interest to one or more users.

59. The computer-readable storage medium of claim 53, wherein the computer-program instructions for uploading are executed responsive to receipt by the remote client of an upload request from a transcoding server, a notification server, an aggregating server, or the data warehouse.

60. A system for tracking end-user content viewing and navigation, the system comprising:
- means for identifying content characteristics of Web content interface pages and corresponding hypertext links; and
- means for distributing data corresponding to a Web content to a remote client;
- responsive to user presentation and selection of interface objects provided by the data, means for recording by the remote client corresponding ones of a group of identifiers to a log, the corresponding ones being used to substantially uniquely identify presented and selected ones of the interface objects;
- means for uploading the log to a device other than the remote client; and
- means for reconciling at the device identifiers recorded in the log in view of the content characteristics to determine Web content of interest to an end-user.

61. A tangible computer-readable data media having encoded thereon computer-program instructions utilized by a data warehouse and executable by a processor, the computer-program instructions when executed by the processor for using a content reference data structure to track end-user content viewing and navigation at a client computing device, the content reference data structure comprising:
- at least one page instance identifier data field for substantially uniquely identifying a presented MPEG still representing a transcoded Web page;
- at least one link instance identifier data field for substantially uniquely identifying a selected hotspot, the selected hotspot representing a hypertext link in the transcoded Web page; and
- a master URL data field to identify a World Wide Web address of a Web version of the transcoded Web page, wherein the page instance identifier is globally unique and the link instance identifier is only unique within the presented MPEG still.

62. The tangible computer-readable media of claim 61, further comprising a transcoded time data field to indicate when the transcoded Web page was converted from Web content to a still and interaction model metadata.

63. The tangible computer-readable media of 61, further comprising a tracking data field to provide a source content author that is associated with a Web version of the transcoded Web page, an input area for specifying application and/or end-user tracking information to be reconciled by the data warehouse.

64. The tangible computer-readable media of 61, further comprising an image information data field to indicate information extracted from a Web version of the transcoded Web page.

65. The tangible computer-readable media of 61, wherein the content reference data structure is for tracking end-user content viewing and navigation of walled garden Web content presented at a client computing device in form of multiple MPEG stills and interaction model metadata.

* * * * *